(12) United States Patent
Nattar Ranganathan et al.

(10) Patent No.: US 12,237,877 B2
(45) Date of Patent: Feb. 25, 2025

(54) HARMONIC-ENHANCED IDENTIFICATION (ID) AND DEVICE RESOLUTION FOR FREQUENCY MODULATING COMMUNICATION

(71) Applicant: Microsoft Technology Licensing, LLC, Redmond, WA (US)

(72) Inventors: Vaishnavi Nattar Ranganathan, Woodinville, WA (US); Jonathan Bernard Lester, Bellevue, WA (US); Jingxian Wang, Pittsburgh, PA (US); Paramvir Bahl, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/490,209

(22) Filed: Oct. 19, 2023

(65) Prior Publication Data
US 2024/0048258 A1 Feb. 8, 2024

Related U.S. Application Data

(62) Division of application No. 17/214,737, filed on Mar. 26, 2021, now Pat. No. 11,848,720.

(51) Int. Cl.
*H04B 17/40* (2015.01)
*G06K 17/00* (2006.01)
*H04B 1/00* (2006.01)
*H04B 1/10* (2006.01)

(52) U.S. Cl.
CPC ......... *H04B 17/402* (2015.01); *H04B 1/0003* (2013.01); *H04B 1/10* (2013.01); *H04B 17/406* (2015.01); *G06K 17/0025* (2013.01)

(58) Field of Classification Search
CPC ...... H04B 17/402; H04B 1/0003; H04B 1/10; H04B 17/406; H04B 17/318; H04B 2001/1072; H04B 1/71637; H04B 1/1027; H04B 17/345; H04B 1/69; H04B 3/46; H04B 15/005; H04B 1/1036; H04B 1/109; G06K 17/0025; G06K 7/0095; G06K 7/10069; G06K 7/10; G06K 7/00; G06K 19/0726; G06K 19/072; H04W 72/542; H04W 24/08; H04W 24/02; H04W 56/0035; H04W 88/06; H04W 88/10; H04W 4/027; H04W 4/38
See application file for complete search history.

(56) References Cited

U.S. PATENT DOCUMENTS

| | | | |
|---|---|---|---|
| 2008/0079540 A1* | 4/2008 | Aull | H04B 5/77 |
| 2009/0086863 A1* | 4/2009 | Komninakis | H04B 1/109 |
| 2015/0050892 A1* | 2/2015 | Prather | H04B 17/345 455/67.13 |
| 2016/0139237 A1* | 5/2016 | Connolly | G06K 7/10 |

\* cited by examiner

*Primary Examiner* — Lana N Le
(74) *Attorney, Agent, or Firm* — RAY QUINNEY & NEBEKER; Tiffany Healy

(57) ABSTRACT

The devices and methods leverage harmonics to resolve, separate, and identify devices. The devices and methods use the harmonic patterns associated with a frequency modulating (FM) signal to discern and extract information from the FM signal using correlation learning in a crowded spectrum space where the nodes are transmitting simultaneously on multiple channels. The methods and devices leverage harmonics to resolve, separate, and/or identify wireless communication devices.

14 Claims, 6 Drawing Sheets

HARMONIC-ENHANCED IDENTIFICATION (ID) AND DEVICE RESOLUTION FOR FREQUENCY MODULATING COMMUNICATION

CROSS-REFERENCE TO RELATED APPLICATIONS

This application is a Divisional of U.S. application Ser. No. 17/214,737, filed Mar. 26, 2021, which is incorporated herein by reference in its entirety.

BACKGROUND

General communication methods typically operate in digital fashion at a single frequency with amplitude or phase modulation schemes. The communication methods filter out any harmonics or interference, as they are typically undesirable for these communication methods. In cases where a sideband is used for communication, only a single frequency sideband is used. Some examples of these methods include standard passive Radio Frequency Identification (RFID), which uses On/Off Keying modulation at a single carrier, and active Wi-Fi which performs phase-shift keying modulation (PSK) or quadrature amplitude modulation (QAM) at a sub-carrier channel. Wi-Fi also uses channels, but the channels are orthogonal, and the channels are allocated to minimize interference. These methods offer specialized advantages. For instance, RFID communication supports large number of nodes but at very low data throughput and Wi-Fi supports fewer devices at much higher data rates. Even with OFDM, the signals are narrowband with slower digital symbol modulation per sub-carrier.

SUMMARY

In accordance with one aspect of the present disclosure, a receive is disclosed that includes an antenna, one or more processors, memory in electronic communication with the one or more processors, and instructions stored in the memory. The instructions are executable by the one or more processors to receive a plurality of signals from a plurality of sensors in communication with the receiver. The instructions are also executable by the one or more processors to correlate, to each signal of the plurality of signals, a fundamental frequency signal and a harmonic pattern. The instructions are also executable by the one or more processors to use the harmonic pattern correlated to the signal to identify a sensor of the plurality of sensors that sent the signal.

The instructions may be further executable by the one or more processors to use the harmonic pattern correlated to the signal to identify data transmitted from the identified sensor.

The instructions may be further executable by the one or more processors to receive the plurality of signals concurrently from the plurality of sensors.

The plurality of signals may be square wave frequency modulating (FM) signals.

Each sensor of the plurality of sensors may be allocated a non-overlapping frequency band for communicating with the receiver.

The plurality of sensors may be one or more of analog battery-free sensors or radio frequency (RF) battery-free sensors.

The plurality of sensors may be one or more of low-bandwidth sensors or high-bandwidth sensors.

The receiver may be a software defined radio.

In accordance with another aspect of the present disclosure, a method is disclosed of device identification performed by a receiver. The method includes receiving a plurality of signals from a plurality of sensors in communication with the receiver. The method also includes correlating, to each signal of the plurality of signals, a fundamental frequency signal with a harmonic pattern. The method also includes using the harmonic pattern correlated to the signal to identify a sensor of the plurality of sensors that sent the signal.

The method further includes using the harmonic pattern correlated to the signal to identify data transmitted from the identified sensor.

The plurality of signals may be received concurrently from the plurality of sensors.

The plurality of signals may be square wave frequency modulating (FM) signals.

Each sensor of the plurality of sensors may be allocated a non-overlapping frequency band for communicating with the receiver.

The plurality of sensors may be one or more of analog battery-free sensors or radio frequency (RF) battery-free sensors.

The plurality of sensors may be one or more of low-bandwidth sensors or high-bandwidth sensors.

The receiver may be a software defined radio.

In accordance with another aspect of the present disclosure, a method is disclosed that is performed by a receiver for correlating a harmonic pattern to a received signal. The method includes determining a plurality of nodes in a targeted area in communication with the receiver. The method also includes designing a non-overlapping fundamental frequency spectrum for each node of the plurality of nodes to communicate with the receiver. The method also includes generating a set of harmonic patterns for each node of the plurality of nodes based on the non-overlapping fundamental frequency spectrum. The method also includes correlating the set of harmonic patterns with received signals from the plurality of nodes.

Correlating the set of harmonic patterns may further include, for each node of the plurality of nodes, selecting a signal with a smallest frequency shift from a first node of the plurality of nodes, correlating the set of harmonic patterns to the signal from the first node, using a least square to calculate a best matching harmonic pattern from the set of harmonic patterns for the signal, and canceling out harmonics in the signal other than the best matching harmonic pattern for the signal.

Correlating the set of harmonic patterns may further include selecting a second signal with a next smallest frequency shift from a second node of the plurality of nodes, correlating the set of harmonic patterns to the second signal from the second node, using the least square to calculate the best matching harmonic pattern from the set of harmonic patterns for the second signal, and canceling out the harmonics other than the best matching harmonic pattern for the second signal.

The correlated set of harmonic patterns may be used to identify a node of the plurality of nodes that transmitted a corresponding signal.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
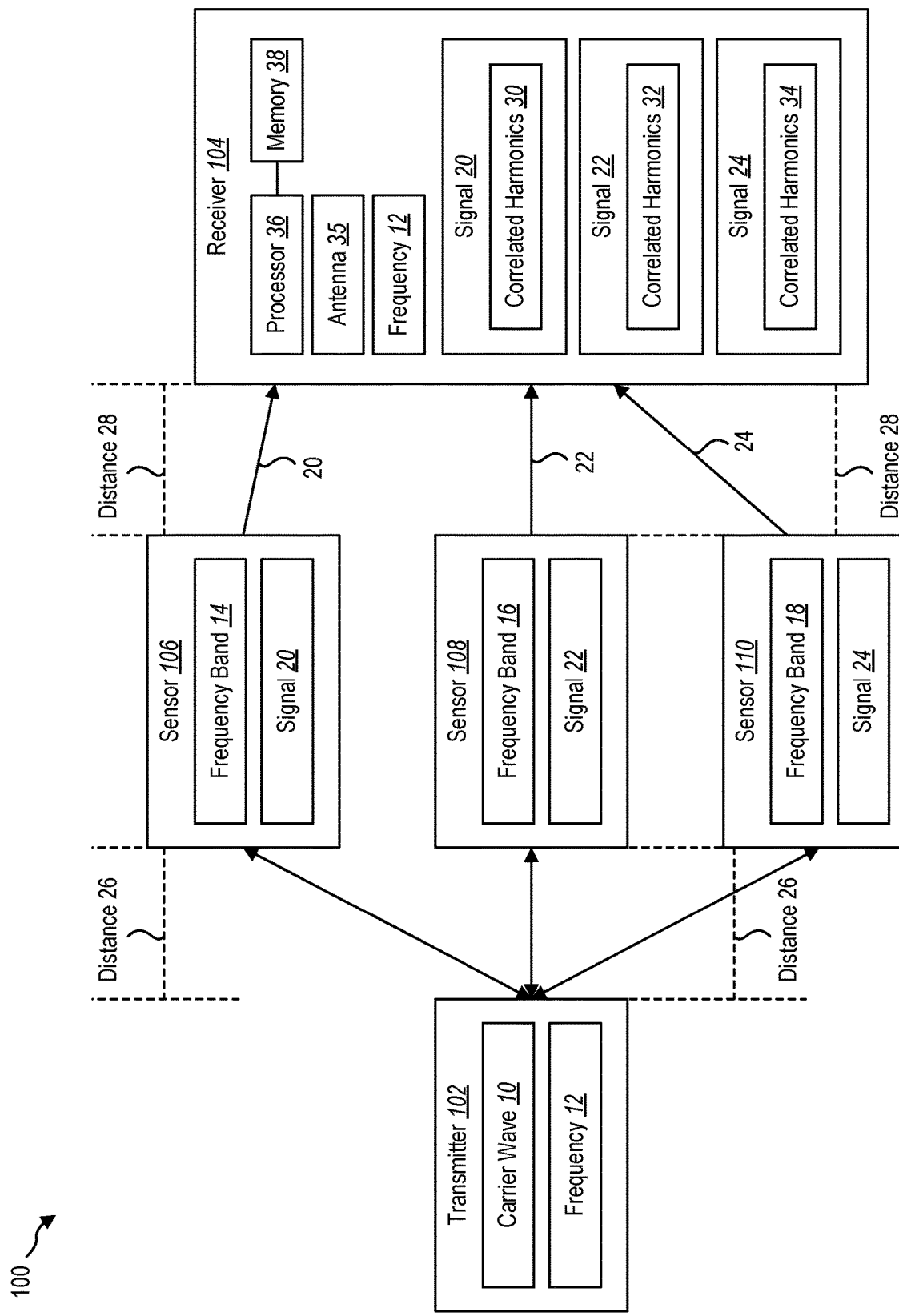
FIG. 1 illustrates an example system using sensors for frequency modulating communication in accordance with implementations of the present disclosure.

The present disclosure relates to methods and devices that uses harmonic-enhanced frequency modulating (FM) communication with frequency division multiplexing to increase spectrum efficiency. Typically, any communication that occurs is performed in a digital fashion at a single frequency with amplitude or phase modulation schemes. Amplitude or phase modulation schemes are performed based on sinewave analysis of the fundamental frequency. The communication methods filter out any harmonics or interference, as they are typically undesirable for these communication methods. In cases where a sideband is used for communication, only a single frequency sideband is used. Some examples of these methods include standard passive Radio Frequency Identification (RFID), which uses On/Off Keying modulation at a single carrier, and active Wi-Fi which performs PSK or QAM at a sub-carrier channel. These methods offer specialized advantages. For instance, RFID communication supports large number of nodes but at very low data throughput and Wi-Fi supports fewer devices at much higher data rates. Even with OFDM, the signals are narrowband with slower digital symbol modulation per sub-carrier.

The methods and devices utilizes the harmonic patterns associated with a FM signal to discern and extract information from the FM signal using correlation learning in a crowded spectrum space where the nodes are transmitting simultaneously on multiple channels. As such, the methods and devices leverage harmonics to resolve, separate, and/o identify wireless communication devices.

The methods and devices use a square wave that is a combination of the sinewaves at multiple frequencies. When a frequency modulated square wave is transmitted, the corresponding receiver sees the fundamental modulated frequency and also the odd harmonics which add up to form the square wave. The odd harmonics are scaled versions of the fundamental frequency that manifest at regular frequency intervals. As such, the harmonics are replicas of the fundamental signal at periodic frequency intervals.

This gives rise to two challenges with existing analytic methods (e.g., peak detection) which have been used to resolve and decode FM data. Firstly, the harmonics of one FM node will span over a frequency range. Adding a second FM node in this range could lead to the collisions between data from multiple nodes. Secondly, identifying specific nodes in a crowded spectrum space becomes challenging, especially in a multipath rich environment. Typically, to avoid these challenges, wireless channels have guard bands that isolate one channel from the other and devices in neighboring channels transmit within time slots. This creates a tradeoff between bandwidth, a number of devices, and throughput.

The methods and devices use a correlation algorithm that learns to use the fact that higher harmonics of the FM signal have greater frequency separation when compared to a fundamental frequency. Harmonics are typically considered unwanted noise and are mitigated with pre and/or post processing and algorithms typically only use the fundamental frequency. The methods and devices may resolve and identify nodes with better accuracy using the harmonics of the FM signal as compared to what can be achieved by looking only at the fundamental frequency, resulting in channels being packed tighter in the allocated spectrum band.

The methods and devices may correlate the harmonics of a FM signal as features to identify and resolve specific transmitting nodes and the data from the transmitting nodes, without the transmitting nodes having to transmit a digital identification (ID) or performing a very restricted band allocation for the communication of the nodes. Even if the fundamental signals of multiple nodes are close to each other, the further harmonics amplify the difference between the nodes and collectively makes it easier to precisely resolve the nodes and the corresponding FM data. As such, the present disclosure enables one-shot wideband multi device analysis enabling devices and/or transmitting nodes to operate across the available frequency band simultaneously and maximize the spectrum utilization.

The methods and devices may use any receiver, such as, but not limited to, a software defined radio (SDR), a radio module attached to a computer, and/or any existing receiver capable of picking up signals in the band and has computation capability. By using SDRs, additional flexibility may be provided. The SDR provides the ability to select which channels to use for communications and modify or change the selected channels as needed, and thus, maximizing the bandwidth available. For example, the SDR may enable a large number of low-power analog RF sensors to operate simultaneously. Moreover, with such continuous harmonic-enhanced analog FM communication, the data throughput can be defined by the SDR receiver without limitations of AD conversion on sensors. The methods and devices may be adapted for other software defined systems that can use FM to communicate data and is not limited by bandwidth requirements of the communicating devices.

One example use case of the present disclosure includes using the methods and devices with low-power analog backscatter sensors to enable low-power temperature sensing, location tracking, gesture recognition, and/or sensing applications. The methods and devices may be used for augmented reality (AR)/virtual reality (VR) applications, smart devices, and/or smart automation. For example, the present disclosure may make non-line-of-sight localization for AR applications to keep track of environment, devices, and/or body (e.g., hand tracking outside camera scope) simpler and/or at a low cost.

Another example use case may include battery-free applications. The methods and devices may provide harmonic-based low-cost localization (particularly indoor non-contact and high-precision localization) and sensing systems. The present disclosure may also enable enhanced device ID based on unique device level imperfections on components, such as, switches in the sensors. Such an ID technique may address challenges with accommodating the ever scaling number of IoT devices in a given spectrum. Battery-free applications may be used in systems, including, but not limited to, AR/VR, healthcare, and/or automated smart systems in homes, workplaces, or other environments.

Another example use case of present disclosure includes using the methods and devices for resolving devices and data extraction in cellular communication, such as, but not limited to 5G communications. Traditionally, communication systems pre-allocate the available bandwidth into channels and not all of the channels can be used simultaneously. The methods and devices enable the efficient use of the entire bandwidth available to the system, allowing concurrent or simultaneous communication across different channels within the available bandwidth. The 5G infrastructure of the present disclosure may support large numbers of IoT sensors (e.g., smart city, logistics, and/or automation). Devices with the IoT sensors may come and/or go from the SDR field of vision. Current IoT sensing schemes look at low data rates with existing setups to accommodate large scale, and typically use TDM. With the FM harmonic method, the present disclosure may get higher data rates by operating multiple sensors simultaneously.

The methods and devices and can coexist with the traditional systems, resulting in a large bandwidth and frequency range being available for communication for cellular communications. The 5G band is large and different sections may be used for different tasks (e.g., sensing, cellular communication, self-driving cars, etc.) By implementing the transmitter and the receiver as flexible modules, the methods and devices may allow different devices to scan bands for occupancy based on data transfer requirements of the devices and latch onto available channels. The FM helps operate several of these devices simultaneously and resolves data and devices more accurately. By using SDRs in the 5G implementations of the present disclosure, a lot of the processing and handling is done in the cloud and the front-ends only receives and transmits the radio signals, unlike legacy cellular systems that had handling as a part of the base stations. Moreover, having the software computation be remote allows the harmonic algorithm of the methods and devices to sit on the edge with sufficient resources even if the scale of devices is large. The algorithms used by the methods and devices, including the harmonic algorithm, may be adapted to any band which can support multichannel FM, which is advantageous given the wide band available in 5G.

The methods and devices may be easily implemented with any software defined communication system to resolve, separate, and/or identify specific communication devices. The present disclosure may be used without any hardware changes. For example, the present disclosure may be used with Software Defined 5G Telecom systems. As such, any existing software defined radios (e.g., any frequency modulation software defined radios) may use the methods of the present disclosure.

One technical advantage of the present disclosure includes the precision of locating a sensing device using a lower overhead. Another technical advantage of the present disclosure includes enabling parallel multi-sensor backscatter operations. Unlike standard digital RFID which uses a time multiplexed algorithm with Slotted aloha protocols, such as, the digital EPC Gen2 for RFID, the present disclosure enables parallel communications.

Another technical advantage of the present disclosure includes leveraging the harmonics to identify signal from a specific sensor in a crowded frequency space. Another technical advantage of the present disclosure includes leveraging harmonics to accommodate and reliably identify multiple frequency modulation analog sensors in a given band.

Another technical advantage of the present disclosure is the ease in which the methods may scale to other Federal Communications Commission (FCC) bands as the device and its receiver shift their operation center frequency (to 2.5 GHz, 5 GHz etc.). The methods of the present disclosure are frequency agnostic methods for analyzing direct FM communication. As such, the present disclosure maximizes the utilization of the bandwidth available for communication.

Referring now to FIG. 1, illustrated is an example system 100 for frequency modulation communication using one or more sensors 106, 108, 110 in communication with a transmitter 102 and a receiver 104. One example of the sensors 106, 108, 110 may include analog battery-free sensors. Another example of the sensors 106, 108, 110 may include a RF battery-free sensor. Other examples of the sensors 106, 108, 110 may include low power sensors, temperature sensors, low-bandwidth sensors (pressure sensors, force sensors, light sensors), and/or high bandwidth sensors (e.g., microphones). In addition, the sensors 106, 108, 110 may be integrated with a device (e.g., a smart device, a wireless device, an IoT device, an AR/VR headset, clocks, gaming devices, and/or a computing device). The sensors 106, 108, 110 may also be part of clothing, tattoos, fabrics, band aids, and/or wearable accessories.

The transmitter 102, the sensors 106, 108, 110, and the receiver 104 may be communicating within an area where the transmitter 102, the sensors 106, 108, 110, and the receiver 104 are within a distance from each other. The transmitter 102 may be within a distance 26 from the one or more sensors 106, 108, 110. For example, the distance 26 may be up to thirteen feet. The distance 26 may change based on the power of the transmitter 102 and/or a type of transmitter 102 used. The receiver 104 may be within a distance 28 from the one or more sensors 106, 108, 110. For example, the distance 28 may be greater than thirty feet. The distance 28 may change based on the type of receiver 104 used. Examples of the area may include, but are not limited to, a room, a building, an arena, a venue, an outdoor space (e.g., a park), and/or a vehicle. While three sensors 106, 108, 110 are illustrated, any number of sensors 106, 108, 110 may be within the area communicating with the transmitter 102 and the receiver 104.

Moreover, the transmitter 102, the sensors 106, 108, 110, and the receiver 104 may be tuned to the same frequency 12 for communicating with each other (e.g., a fundamental frequency). For example, the frequency 12 may be 915 megahertz (MHz). As such, the sensors 106, 108, 110 may be within a predefined area and the sensors 106, 108, 110 may be communicating with the transmitter 102 and/or the receiver 104 at a fundamental frequency 12.

The transmitter 102 may transmit a carrier wave 10 at the specified frequency 12 to each of the sensors 106, 108, 110. The carrier wave 10 may be a FM signal sent as a continuous wave. As such, each of the sensors 106, 108, 110 may receive a continuous carrier wave 10 at a fundamental frequency of 915 MHz from the transmitter 102.

Each sensor 106, 108, 110 receives the carrier wave 10 and may be allocated a different frequency band for communicating with the receiver 104. For example, sensor 106 may be allocated frequency band 14, sensor 108 may be allocated frequency band 16, and sensor 110 may be allocated frequency band 18. The different frequency bands 14, 16, 18 may not overlap and may be within the available industrial, scientific, and medical (ISM) radio band for communication. As such, each of the sensors 106, 108, 110 may have a separate channel for communicating with the receiver 104. Moreover, the spectrum may be uniformly divided for channel allocation for the sensors 106, 108, 110.

Figure 2:
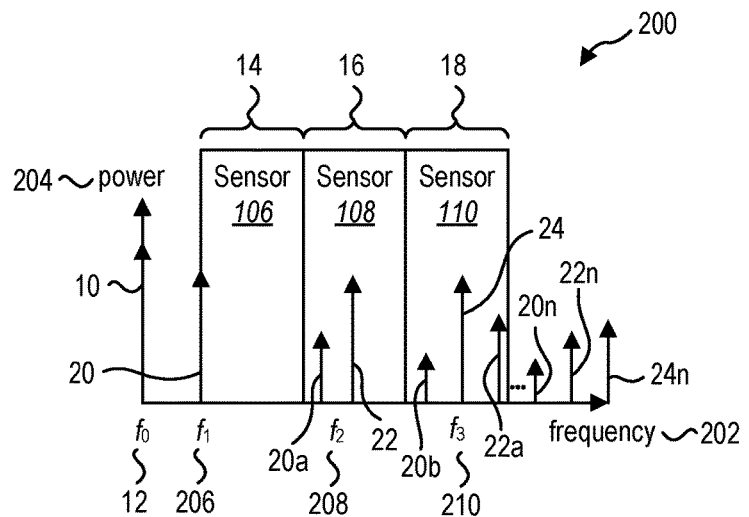
FIG. 2 illustrates an example graph illustrating the different frequency bands allocated for sensors to use for communicating in accordance with implementations of the present disclosure.

Referring now to FIG. 2, illustrated is an example graph 200 showing example frequency bands 14, 16, 18 allocated for sensors 106, 108, 110. Graph 200 has an x-axis mapping the frequency 202 of the signals 20, 22, 24 relative to the power 204 of the signals 20, 22, 24. In addition, the harmonics of the signals 20, 22, 24 are also shown. For example, the signal 20 has the harmonics 20a, 20b, up to 20n, the signal 22 has the harmonics 22b up to 22n, and the signal 24 has the harmonics up to 24n. The carrier wave 10 is transmitted at frequency $f_0$ (e.g., frequency 12). The sensor 106 is allocated frequency band 14 and communicates at a first frequency 206 (e.g., $f_1$). The sensor 108 is allocated frequency band 16 and communicates at a second frequency 208 (e.g., $f_2$). The sensor 110 is allocated frequency band 18 and communicates at a third frequency 210 (e.g., $f_3$). As such, each sensor 106, 108, 110 is allocated a separate, non-overlapping, frequency band for communicating. The harmonics of the signals may occur within other frequency bands than the frequency bands allocated to the sensors for communicating. For example, a first harmonic of the signal 20 (e.g., harmonic 20a) may occur in the band 16 near the frequency 208 allocated to the sensor 108 and the second harmonic of signal 20 (e.g., harmonic 20b) may occur in the third frequency band 18 near the frequency 210 allocated to the sensor 110. Another example includes a first harmonic of the signal 22 (e.g., harmonic 22a) occurring in the third frequency band 18 near the frequency 210 allocated to the sensor 110. As such, harmonics from both the signal 20 (e.g., harmonic 20b) and the signal 22 (e.g., harmonic 22a) may occur in the third frequency band 18.

The size of the frequency bands 14, 16, 18 may vary based on the type of sensor 106, 108, 110 being used, and thus, effecting the number of sensors 106, 108, 110 that may be able to communicate simultaneously with the transmitter 102 and/or the receiver 104. One example use case using battery-free sensors includes 15 temperature sensors being allocated within a 1 MHz band with non-overlapping separate channels for each sensor, which scales to about 180 sensors in the FCC permitted band at 915 MHz being able to simultaneously communicate at once with the transmitter 102 and/or the receiver 104. Battery-free sensors may be more passive on the sensor side, and thus, the number of devices communicating at once may be limited. By using active radio sensors, the device stuffing in the band may be made more efficient by having more control and/or flexibility over the subcarrier frequency response by making it an active radio, which may be more relevant to 5G where low-power devices are not the main focus.

Referring back to FIG. 1, the sensors 106, 108, 110 may transmit signals 20, 22, 24 with data from the sensors 106, 108, 110 to the receiver 104 using the allocated frequency bands 14, 16, 18. The signals 20, 22, 24 may be a frequency modulated square wave with the fundamental frequency signal that includes the data from the sensors 106, 108, 110 and a plurality of harmonics. The harmonics are replicas of the fundamental signal at periodic frequency intervals. As such, the harmonics may include the data from the sensors 106, 108, 110. In some implementations, the signals 20, 22, 24 may be sub-carrier backscatter signals. As such, multiple copies of the same data may be transmitted using the harmonics.

In some implementations, the sensor data from sensors 106, 108, 110 may first be converted to a FM signal on board (using direct frequency modulation). This signal is mixed into the carrier by using the square wave to trigger an RF switch at the antenna port. The RF switch acts as a mixer, by changing the antenna impedance at its on and off state, resulting in a subcarrier FM that rides on top of the carrier wave. In case of active transmission (where the sensor is also replaced by an application specific active radio, the carrier and the subcarrier (fundamental of the specific device) may be generated on board and mixed before transmission.

The receiver 104 receives the signals 20, 22, 24 from the sensors 106, 108, 110 using antenna 35 and may use an algorithm to determine correlated harmonics of the FM signals 20, 22, 24. The receiver 104 may use the correlated harmonics as features to identify and resolve specific transmitting sensors 106, 108, 110 and/or identify the data sent from the sensors 106, 108, 110. For example, if the sensors 106, 108, 110 are integrated with a device and/or a transmitting node, the receiver 104 may use the correlated harmonics to identify the device and/or transmitting node.

The receiver 104 may be any radio with an antenna 35 capable of picking up signals in the band and has computation capability. One example of the receiver 104 is a software defined radio. By using a software defined radio, additional flexibility may be provided to system 100. For example, the software defined radio provides the ability to select which channels (e.g., frequency bands 14, 16, 18) to use for communications and modify or change the selected channels as needed. Moreover, with such continuous harmonic-enhanced analog FM communication, the data throughput can be defined by the SDR receiver 104 without limitations of AD conversion on sensors.

If low bandwidth sensors 106, 108, 110 are used in system 100, a lower sampling rate and FFT size at the receiver 104 may be achieved. Thus, a common receiver with moderate processing capability may be sufficient for low bandwidth sensors 106, 108, 110. If high-bandwidth sensors 106, 108, 110 (e.g., multiple microphones) are used in system 100, the processing at the receiver 104 can be modified for higher sampling rates and a higher FFT size at the receiver 104 for better frequency resolution. With a combination of high and low bandwidth sensors 106, 108, 110, adaptive processing across allocated channels can be made feasible using a software defined receiver 104.

Another example of the receiver 104 is an application specific radio (e.g., Bluetooth). The receiver 104 may be specially programmed or designed based on the application.

The receiver 104 may include one or more processors 36 in electronic communication with at least one memory 38. The receiver 104 may receive the signals 20, 22, 24 and determine the correlated harmonics 30, 32, 34 for each of the received signals 20, 22, 24. For example, the signal 20 may have correlated harmonics 30, the signal 22 may have correlated harmonics 32, and the signal 24 may have correlated harmonics 34. The correlated harmonics 30, 32, 34 are replicas of the fundamental signal at periodic frequency intervals. As such, the signals 20, 22, 24 include the fundamental modulated frequency signal and the odd harmonics.

The receiver 104 may use the following equation on the signals 20, 22, 24 to identify the fundamental signal and the corresponding harmonics:

$$x(t) = 4/pi(\sin(wt) + \sin(3\ wt)/3 + \sin(5\ wt)/5 + \ldots) \quad (1)$$

where sin (wt) is the fundamental signal, sin(3 wt) is the first harmonic, and sin(5 wt) is the third harmonic. The equation may continue for the odd harmonics of the signals 20, 22, 24. The odd harmonics are scaled versions of the fundamental signal that manifest at regular frequency intervals.

The receiver 104 may use the correlated harmonics 30, 32, 34 to identify which sensor 106, 108, 110 transmitted the signals 20, 22, 24 and the FM data transmitted from the sensor 106, 108, 110. Even if the fundamental signals of multiple sensors 106, 108, 110 are close to each other, the further harmonics amplify their difference and collectively make it easier to precisely resolve and/or identify a particular sensor 106, 108, 110 and the corresponding FM data for the sensor 106, 108, 110. In addition, where an application specific sensor may be allocated a band for communicating based on a sensing task (e.g., temperature is low bandwidth and a microphone is high bandwidth), the receiver 104 may infer this context detail based on the signals 20, 22, 24 received from the sensors 106, 108, 110 and what band the sensors 106, 108, 110 are operating at. For example, for applications, such as, human body sensing and/or automation in cars, several different kinds of sensors may be required, all of which are part of one system, and collectively determine the health of a human and/or a car. As such, a collective correlation may be implemented on the spectrum allowing for sensor fusion on the frequency domain.

By having the transmitter 102 and the receiver 104 as separate devices in system 100, greater flexibility in selecting transmitters 102 and/or receivers 104 may be achieved. Moreover, low cost transmitters 102 and/or receivers 104 may be used in system 100, such as, but not limited to, RTL-SDR, COTS low-cost programmable transmitters, and/or USRP SDRs.

In some implementations, a plurality of transmitters 102 and/or receivers 104 may be used within the area. For example, distributed transmitter units may be sending the carrier wave 10 to the plurality of sensors 106, 108, 110. In addition, a plurality of receivers 104 may be in communication with the sensors 106, 108, 110.

In some implementations, the transmitter 102 and the receiver 104 may be the same SDR. Examples of SDRs with transmitting and receiving capabilities include, but are not limited to, USRP SDR B210, an Ettus Research N210 Software Defined RadioN210, and/or any SDR capable of transmitting and receiving. The computational capacity may be increased by using one SDR for the transmitter 102 and the receiver 104.

One example use case of system 100 may include device localization. System 100 may add to the precision of locating of devices (e.g., devices with sensors 106, 108, 110 and/or transmitting nodes with sensors 106, 108, 110) at a much lower device overhead without requiring a specific device ID for the device localization. For example, system 100 uses angle of arrival and time of flight information for localization. In addition, the angle of arrival and time of flight information may be coupled with other sensors, such as optical or sound based location tracking, for higher precision since system 100 is a sensor board. The FM method achieves a larger band response in one-shot due to the harmonics (typical localization methods have to provide an active large band response).

Another example use case of system 100 includes using low-power analog backscatter sensors 106, 108, 110. Such sensors 106, 108, 110 may enable low-power localization of the transmitting nodes (e.g., the devices, fabrics, or wearable accessories the sensors 106, 108, 110 are part of) and/or gesture recognition of the transmitting nodes. Another example use case of system 100 may include sensing applications for AR/VR and/or smart automation.

System 100 enables parallel communications with multiple devices and/or access points. System 100 may enable continuous communication with multiple devices across the entire spectrum allocated for the communication. As such, higher channel utilization may be achieved by system 100 by using parallel channels for concurrent communications.

System 100 is also frequency agnostic. If the transmitter 102, the receiver 104, and the analog battery free sensors 106, 108, 110 are tuned to the same frequency 12, system 100 may scale to different frequencies and may be used for any two way communications (e.g., short range communications, cellular, Wi-Fi, and/or RFID).

System 100 may also be beneficial in multipath-rich environments, where the harmonic information may be used to augment the fundamental signal that has been attenuated and/or affected by pathloss.

System 100 may enable new applications for localization and sensing may be enabled by integrating tiny sensors into existing devices (e.g., wireless devices, clocks, IoT devices, smart devices, laptops, tablets, AR/VR headsets, mouse, headphones, clothing fabrics, materials, wearable accessories, and/or tattoos). As such, system 100 enables devices which can operate across the available frequency band to operate concurrently, and thus, maximizing the use of the available spectrum. Moreover, system 100 leverages harmonics to accommodate and reliably identify multiple frequency modulation analog sensors in a given band.

Figure 3:
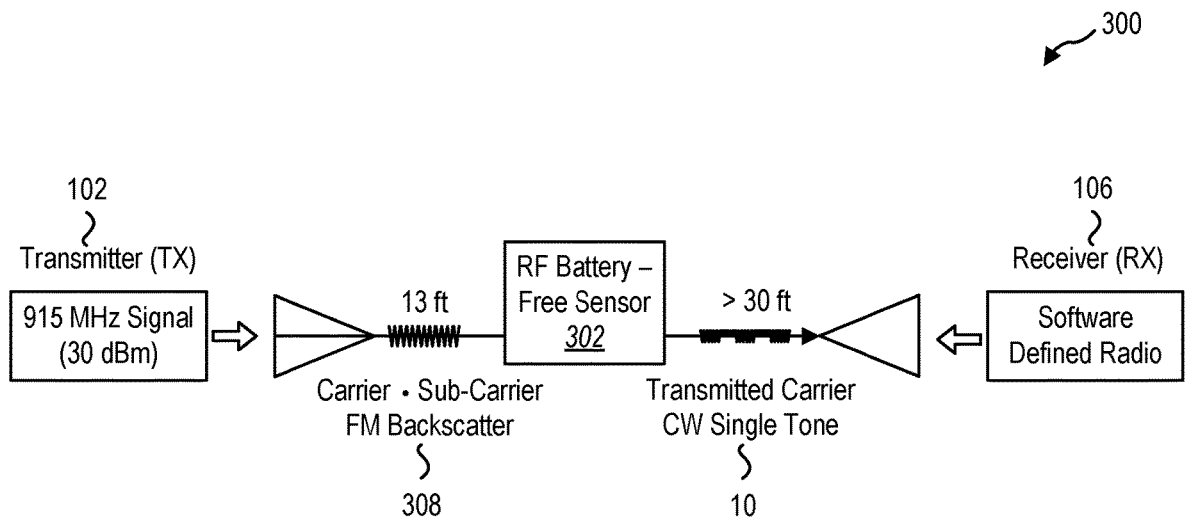
FIG. 3 illustrates an example system using RF battery-free sensors for frequency modulating communication in accordance with implementations of the present disclosure.

Referring now to FIG. 3, illustrated is an example system 300 for frequency modulation communication using one or more RF battery-free sensors 302 in communication with a transmitter 102 and a receiver 104. The functionality of the transmitter 102 and the receiver 104 are discussed above in FIG. 1. The RF battery-free sensors 302 may include, but are not limited to, temperature sensors, force sensors, and/or microphones. The RF sensor platform (RF SP) power budget may be between 35 micro watts (μW) to 160 μW. Resulting in an ultra-low power sensor 302. The battery augmented range may be greater than 50 feet ISO range, and the 200 mAH coil cell is for 85 days. As such, the RF battery-free sensors may provide continuous monitoring without requiring a battery or charge. The RF battery-free sensors 302 may be part of a device. In addition, the RF battery-free sensors 302 may fit on a wearable device, such as, but not limited to, a flexible material, and/or any other wearable materials or accessories.

The transmitter 102 may transmit a continuous 915 MHz carrier wave signal 10 to the RF battery-free sensors 302 up to 30 decibel-milliwatts (dBm), which is 1 watt in this band. The transmitter 102 may be up to 13 feet away from the RF battery-free sensors 302 and may transmit the carrier wave signal 10 at 26 dBm. The RF battery-free sensors 302 may detect data and may transmit the detected data using a sub-carrier FM backscatter signal 308 to the receiver 104.

The receiver 104 may receive the carrier wave and a sub-carrier FM backscatter signal 308 from the RF battery-free sensors 302. The sub-carrier FM backscatter signal 308 may be used to communicate the data from the RF battery-free sensors 302 to the receivers. The receiver 104 may be over 30 feet away from the RF battery-free sensors 302.

The receiver 104 may be a software defined radio and may perform analysis on the carrier wave 10 and the sub-carrier FM backscatter signal 308 to identify the correlated harmonics for the different RF battery-free sensors 302. The receiver 104 may use the correlated harmonics to identify the data sent from the different RF battery-free sensors 302. As such, system 300 may be used by low powered sensors (e.g., RF battery-free sensors 302) to communicate data using the sub-carrier FM backscatter signal 308.

System 300 enables parallel multi-sensor backscatter operation, unlike standard digital RFID which uses a time multiplexed algorithm with Slotted aloha protocols, such as, the digital EPC Gen2 for RFID.

Figure 4:
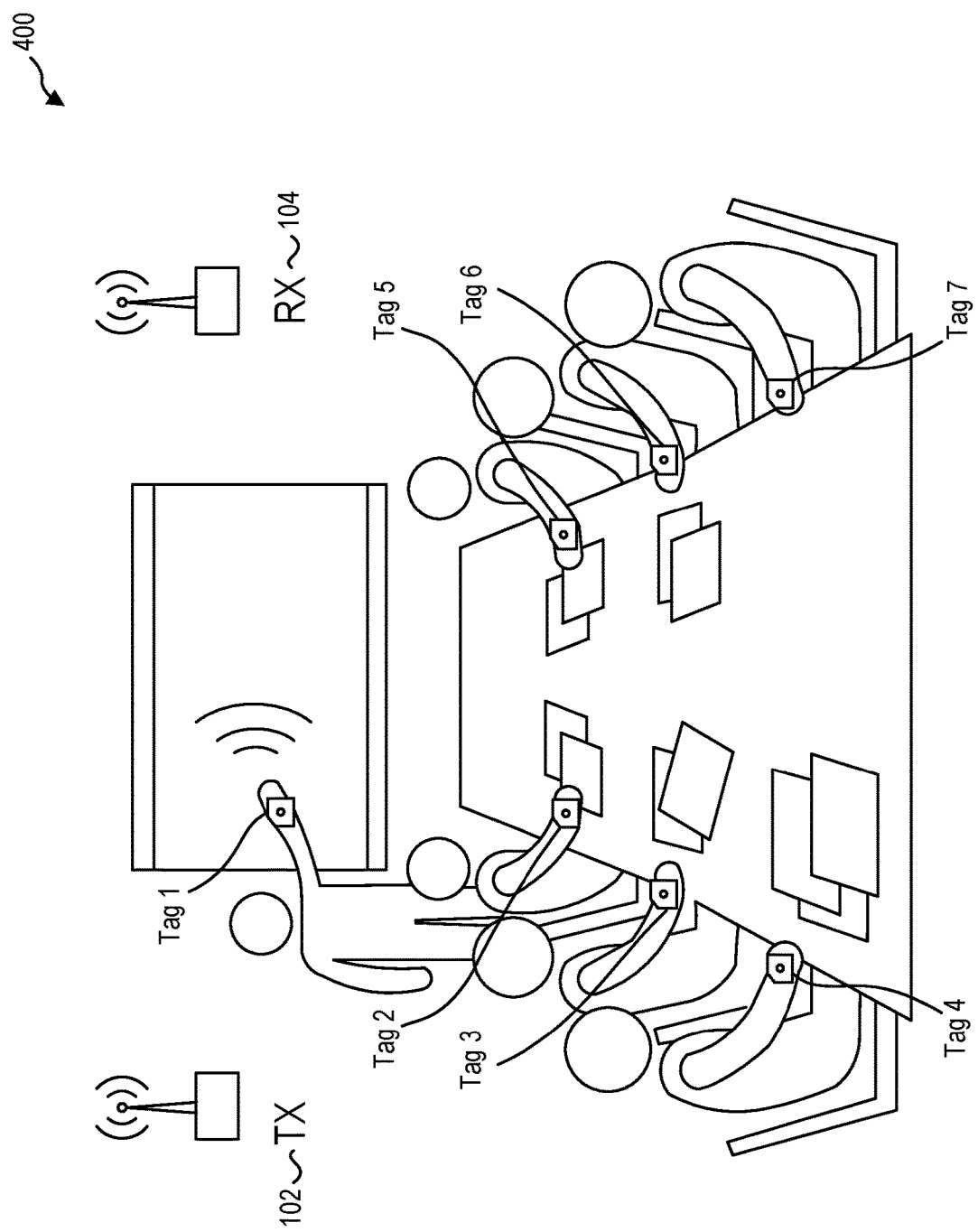
FIG. 4 illustrates an example environment using RF battery-free sensors for temperature sensing in accordance with implementations of the present disclosure.

Referring now to FIG. 4, illustrated is an example environment 400 for using system 100 or 300 for frequency modulation communications to monitor temperature of individuals within a conference room. Each individual in the conference room may be wearing a tag (e.g., Tag 1, Tag 2, Tag 3, Tag 4, Tag 5, Tag 6, Tag 7). Each tag may include a battery-free temperature sensor (e.g., sensors 106, 108, 110 or sensors 302) that is monitoring the temperature of the individual wearing the tag. As such, the tags are an example of a wearable accessory with the sensors integrated within the wearable accessory. The tags may provide continuous monitoring of the temperature of the individuals and the sensors may be in constant communication with the transmitter 102 and the receiver 104.

Each sensor of the tags (e.g., Tag 1, Tag 2, Tag 3, Tag 4, Tag 5, Tag 6, Tag 7) may operate simultaneously in the 915 MHz band and may continuously monitor the body temperature of the individuals within a conference room. Each tag and corresponding sensor may be allocated a non-overlapping separate channel (e.g., frequency bands 14, 16, 18) for communicating within the 915 MHz band within a 200 KHz band. For example, up to 15 sensors may be allocated within a 1 MHz band.

Each tag may receive the carrier wave 10 from the transmitter 102 at 915 MHz and may add the body temperature data to a signal from the tags (e.g., signals 20, 22, 24, sub-carrier backscatter signal 308). The receiver 104 may receive the different signals from the different tags (e.g., the body temperature data) continuously. As such, each tag may transmit the signals to the receiver 104 at the same time and the body temperatures of the individuals in the room may be continuously monitored by the receiver 104.

The receiver 104 may identify the correlated harmonics (e.g., correlated harmonics 30, 32, 34) for the different signals. The receiver 104 may use the correlated harmonics to identify which tag transmitted the different signals and may track the body temperatures of the individuals within the conference room using correlated harmonics for each of the received signals from the different tags.

Figure 5:
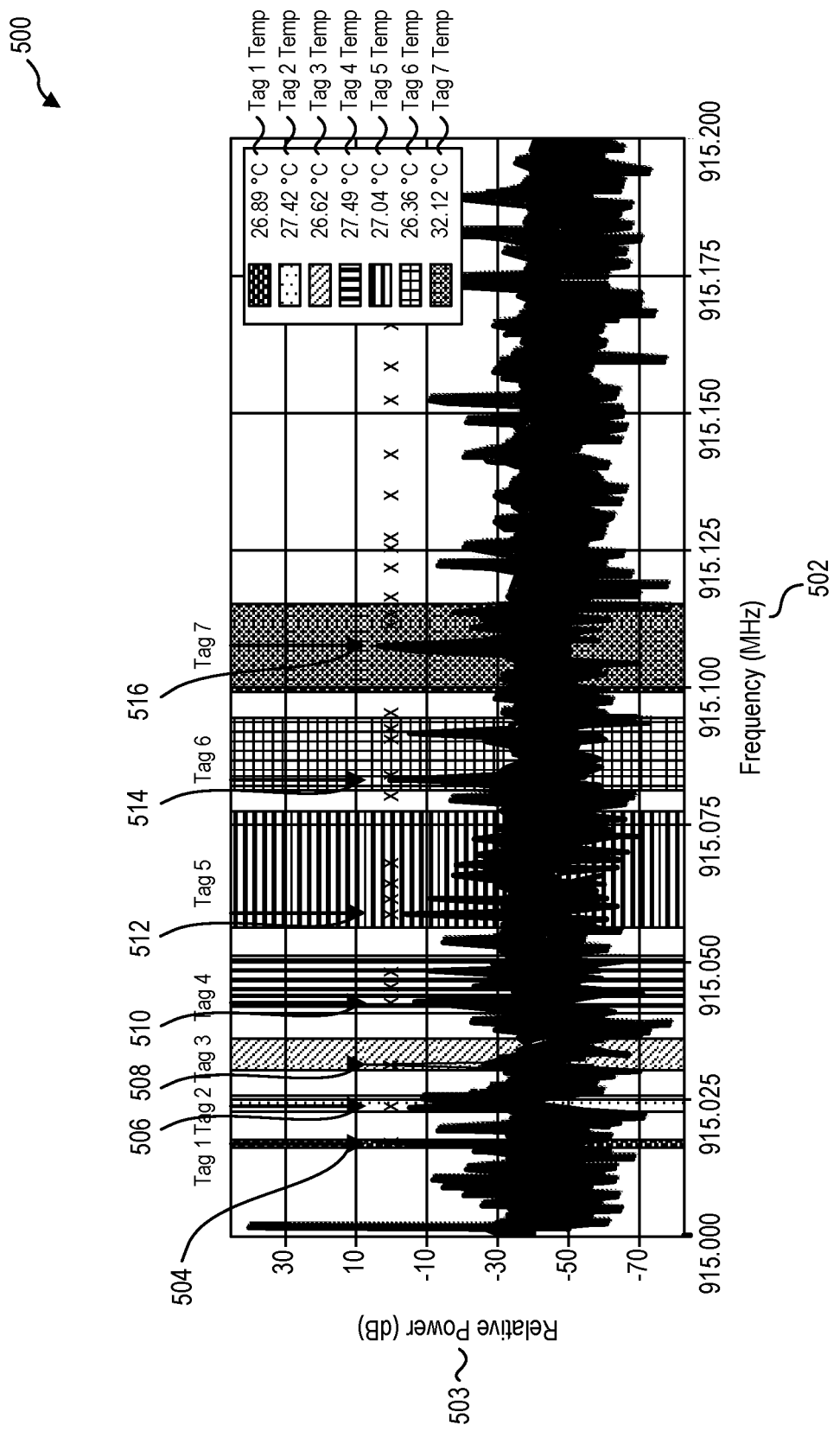
FIG. 5 illustrates an example graph of temperature sensing results in accordance with implementations of the present disclosure.

Referring now to FIG. 5, illustrated is an example graph 500 of the tracked temperature of the seven individuals from environment 400 using the temperature sensors on the wearable tags (e.g., Tag 1, Tag 2, Tag 3, Tag 4, Tag 5, Tag 6, Tag 7). Graph 500 has an x-axis 502 mapping the frequency in MHz and a y-axis 503 mapping the relative power in dB of the signals transmitted from the sensors in the tags. The arrows 504, 506, 510, 512, 514, 516 indicate the fundamental signal for each sensor in the tags. For example, the fundament signal for Tag 1 is indicated by arrow 504; the fundament signal for Tag 2 is indicated by arrow 506; the fundament signal for Tag 3 is indicated by arrow 508; the fundament signal for Tag 4 is indicated by arrow 510; the fundament signal for Tag 5 is indicated by arrow 512; the fundament signal for Tag 6 is indicated by arrow 514; and the fundament signal for Tag 7 is indicated by arrow 516. The other "x" markings on the graphs indicate the corresponding harmonics for the different fundamental signals.

The harmonics may be used by the receiver 104 to identify which sensor transmitted the signal. The receiver 104 may use this identification to associate the temperature readings to the corresponding tag. The legend shows the temperature readings associated with the different tags. For example, Tag 1 temperature is 26.89° C.; Tag 2 temperature is 27.42° C.; Tag 3 temperature is 26.62° C.; Tag 4 temperature is 27.49° C.; Tag 5 temperature is 27.04° C.; Tag 6 temperature is 26.36° C.; and Tag 7 temperature is 32.12° C. The temperature information may be used to identify individuals in the conference room with an elevated temperature (e.g., the individual wearing Tag 7). Moreover, the temperature information may be used to alert other individuals that they were located nearby an individual with an elevated temperature (e.g., the individual wearing Tag 6). A privacy benefit may occur since the sensors may be identified based on the signal characteristics of the harmonics without using a device identification or being associated with an individual.

Figure 6:
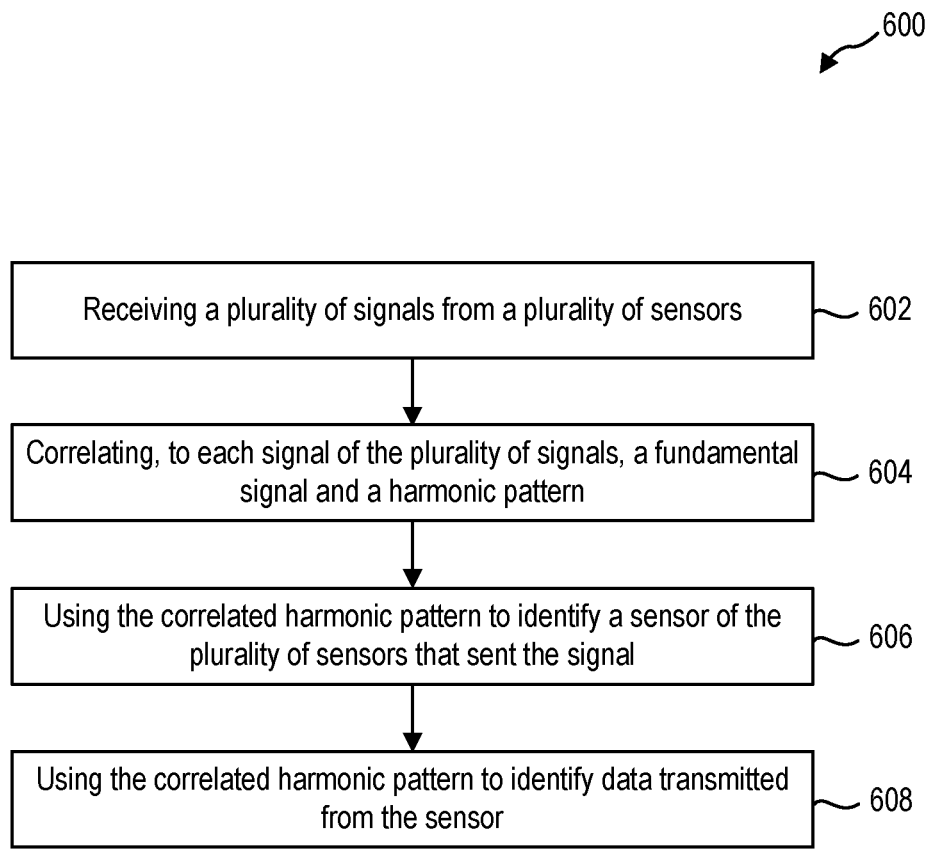
FIG. 6 illustrates an example method for device identification in accordance with implementations of the present disclosure.

Referring now to FIG. 6, illustrated is an example method 600 performed by a receiver 104 (FIG. 1, FIG. 3) for identifying devices. The receiver 104 may be any radio that may handle the frequency bands allocations and receive signals. One example of the receiver 104 is a software defined radio. Another example of the receiver is an application specific radio. The actions of method 600 may be discussed below with reference to the architectures of FIG. 1 and FIG. 3.

At 602, method 600 may include receiving a plurality of signals from a plurality of sensors. The receiver 104 receives a plurality of signals 20, 22, 24 from a plurality of sensors 106, 108, 110 using antenna 35. The signals 20, 22, 24 may be square wave frequency modulating (FM) signals with a fundamental signal transmitted at a frequency and a plurality of odd harmonics. The signals 20, 22, 24 may be continuously transmitted to the receiver and the receiver 104 may receive the plurality of signals 20, 22, 24 concurrently from the plurality of sensors 106, 108, 110. As such, the receiver 104 may simultaneously receive the plurality of signals 20, 22, 24 from the plurality of sensors 106, 108, 110.

Each sensor 106, 108, 110 may be allocated a different frequency band (e.g., frequency bands 14, 16, 18) for communicating with the receiver 104. The different frequency bands 14, 16, 18 may be separate from one another (e.g., do not overlap) and may be within the available ISM band for communication. As such, each of the sensors 106, 108, 110 may have a separate channel for communicating with the receiver 104.

The sensors 106, 108, 110 may include, but are not limited to, analog battery-free sensors, RF battery-free sensors, temperature sensors, sound sensors, motion sensors, low-bandwidth sensors (pressure sensors, force sensors, light sensors), and/or high bandwidth sensors (e.g., microphones). In addition, the sensors 106, 108, 110 may be integrated with a device or part of a device. Example devices may include, but are not limited to, a smart device, a wireless device, an IoT device, an AR/VR headset, clocks, gaming devices, and/or a computing device. The sensors 106, 108, 110 may be integrated with clothing, tattoos, fabrics, band aids, and/or wearable accessories.

At 604, method 600 may include correlating, to each signal of the received signals, a fundamental frequency signal and a harmonic pattern. The receiver 104 may determine the fundamental frequency signal and the correlated harmonics 30, 32, 34 for each of the received signals 20, 22, 24. The signals 20, 22, 24 may be a frequency modulated square wave with the fundamental frequency signal that includes the data from the sensors 106, 108, 110 and a plurality of harmonics. The correlated harmonics 30, 32, 34 are replicas of the fundamental frequency signal at periodic frequency intervals. As such, the signals 20, 22, 24 include the fundamental modulated frequency and the odd harmonics. In some implementations, the signals 20, 22, 24 may be sub-carrier backscatter signals. As such, multiple copies of the same data may be transmitted using the harmonics.

The receiver 104 may use the following equation on the signals 20, 22, 24 to identify the fundamental signal and the corresponding harmonics:

$$x(t)=4/pi(\sin(wt)+\sin(3\ wt)/3+\sin(5\ wt)/5+ \ldots) \quad (1)$$

where sin (wt) is the fundamental signal, sin(3 wt) is the first harmonic, and sin(5 wt) is the third harmonic. The equation may continue for the odd harmonics of the signals 20, 22, 24. The odd harmonics are scaled versions of the fundamental signal that manifest at regular frequency intervals.

At 606, method 600 may include using the correlated harmonic pattern to identify a sensor of the plurality of sensors that sent the signal. The receiver 104 may use the correlated harmonics as features to identify and resolve specific transmitting sensors 106, 108, 110 and/or identify the data sent from the sensors 106, 108, 110. For example, if the sensors 106, 108, 110 are integrated with a device and/or a transmitting node, the receiver 104 may use the correlated harmonics to identify the device and/or transmitting node.

The receiver 104 may use the correlated harmonics 30, 32, 34 to identify which sensor 106, 108, 110 transmitted the signals 20, 22, 24 and the FM data transmitted from the sensor 106, 108, 110. Even if the fundamental signals of multiple sensors 106, 108, 110 are close to each other, the further harmonics amplify their difference and collectively make it easier to precisely resolve and/or identify a particular sensor 106, 108, 110 and the corresponding FM data for the sensor 106, 108, 110.

At 608, method 600 may include using the correlated harmonic pattern to identify data transmitted from the identified sensor. The receiver 104 may use the correlated harmonics 30, 32, 34 to identify the FM data transmitted from the sensor 106, 108, 110.

One example use case for method 600 includes resolving devices and data extraction in cellular communication, such as, but not limited to 5G communications. Another example use case for method 600 includes laser activation using a tiny photovoltaic cell for on-demand-wakeup and to harvest energy. Combined with RF localization techniques, method 600 may add to the precision of locating a sensing device at a much lower device overhead.

Figure 7:
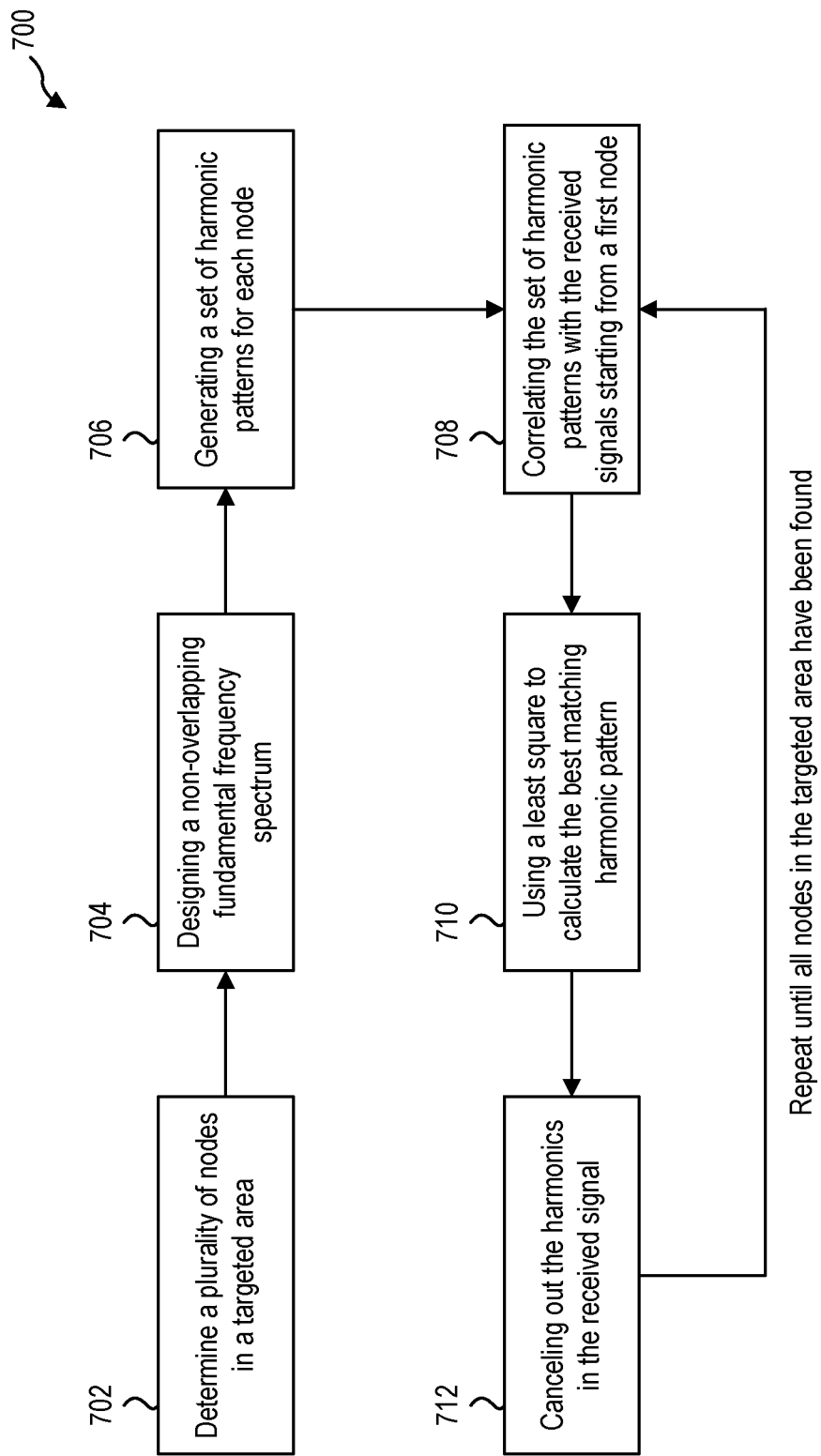
FIG. 7 illustrates an example method for harmonic correlations in accordance with implementations of the present disclosure.

Referring now to FIG. 7, illustrated is an example method 700 performed by a receiver 104 (FIG. 1, FIG. 3) for correlating a harmonic pattern to a received signal. The receiver 104 may be any receiver, such as, but not limited to, a software defined radio (SDR), a radio module attached to a computer, an application specific radio, and/or any existing receiver capable of picking up signals in the band and has computation capability. The actions of method 700 may be discussed below with reference to the architectures of FIG. 1 and FIG. 3.

At 702, method 700 may include determining a plurality of nodes in a targeted area. The receiver 104 may determine a plurality of nodes with at least one sensor (e.g., sensors 106, 108, 110) in communication with the receiver 104. The plurality of nodes may include, but are not limited to, wireless devices, clocks, IoT devices, smart devices, laptops, tablets, computing devices, gaming devices, AR/VR headsets, a mouse, headphones, clothing, fabrics, flexible materials, wearable accessories, and/or tattoos.

The receiver 104 may determine a maximum number of nodes in the targeted area. The maximum number of nodes may include the total number of nodes that may concurrently communicate with the receiver 104. The maximum number of nodes may be based on the available ISM band and the type of sensor or node communicating with the receiver 104. For example, if the plurality of nodes included a temperature sensor, 15 temperature sensors may be allocated within a 1 MHz band by allocating non-overlapping separate channel for each sensor. As such, the maximum number of nodes may be around 180 nodes in the FCC permitted band at 915 MHz.

The maximum number of nodes may also be a total number of nodes in a targeted area and/or within a distance from the receiver 104. For example, if the receiver 104 is in a lobby of a building (e.g., the targeted area), the maximum number of nodes may be the total number of nodes currently located in the lobby (e.g., 20 individuals currently in the lobby).

At 704, method 700 may include designing a non-overlapping fundamental frequency spectrum. The receiver 104 may design a non-overlapping fundamental frequency spectrum, with a guarded band in the available ISM band for each node of the plurality of nodes to use for communicating with the receiver 104. The size of the frequency spectrum (e.g., frequency band 14, 16, 18) may vary based on the type of node and/or sensor in communication with the receiver 104. Moreover, more nodes are accommodated in a larger band. As such, bands may be picked based on application and/or expected nodes for the application. The example of temperature sensing in the room might need a max of 30 nodes for instance and the bands may be selected based on the max number of nodes expected. In some implementations, each node may be allocated a non-overlapping separate channel (e.g., frequency bands 14, 16, 18) for communicating with the receiver 104.

At 706, method 700 may include generating a set of harmonic patterns for each node. The receiver 104 may determine, for each of the received signals from each node, the fundamental frequency signal (e.g., a signal at a specified frequency) and a set of harmonic patterns. The harmonic patterns are replicas of the fundamental signal at periodic frequency intervals. The odd harmonics are scaled versions of the fundamental signal that manifest at regular frequency intervals. The receiver 104 may use the following equation on the signals 20, 22, 24 to identify the fundamental signal and the corresponding harmonics:

(1) x(t)=4/pi(sin (wt)+sin(3 wt)/3+sin(5 wt)/5+ . . . )

where sin (wt) is the fundamental signal, sin(3 wt) is the first harmonic, and sin(5 wt) is the third harmonic.

The receiver 104 may generate a set of harmonic patterns based on a set of harmonic parameters, the harmonic parameters including the frequency interval between adjacent harmonic, the amplitude of the harmonics and the number of the harmonics. Thus, the receiver 104 uses the parameters to generate a possible set of harmonic patterns for each node.

At 708, method 700 may include correlating the set of harmonic patterns with the received signals. The receiver 104 may correlate the set of harmonic patterns with the received signals starting from a first node with the smallest frequency shift in the harmonic patterns as compared to the frequency shifts of the other signals.

At 710, method 700 may include using a least square to calculate the best matching harmonic pattern. The best matching harmonic pattern is the harmonic pattern with a highest correlation (highest matching score) with the detected signal in the band. The receiver 104 may use any correlation method to identify the best matching harmonic pattern. In some implementations, the receiver 104 may use a least square to calculate the best matching harmonic pattern from the set of harmonic patterns for the first node. The receiver 104 may calculate the best matching harmonic pattern by finding the harmonic parameters E of harmonic pattern H(E) that best-fit the observed signals $H_{obs}$ at the receiver 104 using the following formula, this formula can be resolved by least square method:

$$E^* = \operatorname*{argmin}_{E} \sum \|H(E) - H_{obs}\|^2$$

At 712, method 700 may include canceling out the harmonics in the received signal for the first node. The receiver 104 may cancel out harmonics in the signal other than the best matching harmonic pattern for the signal.

Method 700 may return to 708 and repeat. For example, the receiver 104 may select a second signal with a next smallest frequency shift from a second node and may correlate the set of harmonic patterns to the second signal. The receiver 104 may use the least square to calculate the best matching harmonic pattern from the set of harmonic patterns for the second signal and may cancel out the harmonics other than the best matching harmonic pattern for the second signal. Method 700 may continue to return to 708 and repeat until all nodes in the targeted area have been found (e.g., the maximum number of nodes in the targeted area).

Method 700 may use the correlated set of harmonic patterns to identify a node of the plurality of nodes that transmitted a corresponding signal. In addition, method 700 may be easily integrated into everyday devices, such as, but not limited to, laptops and clocks because method 700 is lightweight in terms of signal processing.

Each of the components described herein may be in communication with each other using any suitable communication technologies. In addition, while the components are shown to be separate, any of the components or subcomponents may be combined into fewer components, such as into a single component, or divided into more components as may serve a particular implementation.

Moreover, the components may include hardware, software, or both. For example, the components may include one or more instructions stored on a computer-readable storage medium and executable by processors of one or more computing devices. The processors (e.g., processor 36) may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. In an alternative configuration, a combination of processors (e.g., an ARM and DSP) could be used. When executed by the one or more processors, the computer-executable instructions of one or more computing devices can perform one or more methods described herein. Alternatively, the components may include hardware, such as a special purpose processing device to perform a certain function or group of functions. Additionally, or alternatively, the components may include a combination of computer-executable instructions and hardware.

Instructions and data may be stored in memory (e.g., memory 38). The instructions may be executable by the processor to implement some or all of the functionality disclosed herein. Executing the instructions may involve the use of the data that is stored in the memory. Any of the various examples of modules and components described herein may be implemented, partially or wholly, as instructions stored in memory and executed by the processor. Any of the various examples of data described herein may be among the data that is stored in memory and used during execution of the instructions by the processor. For example, the memory may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, embodiments of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method performed by a receiver for correlating a harmonic pattern to a received signal, comprising:
    determining a plurality of nodes in a targeted area in communication with the receiver;
    designing a non-overlapping fundamental frequency spectrum for each node of the plurality of nodes to communicate with the receiver;
    generating a set of harmonic patterns for each node of the plurality of nodes based on the non-overlapping fundamental frequency spectrum; and
    correlating the set of harmonic patterns with received signals from the plurality of nodes.

2. The method of claim 1, further comprising:
    selecting a signal from the received signals;
    using a least square to calculate a best matching harmonic pattern from the set of harmonic patterns for the signal; and
    canceling out harmonics in the signal other than the best matching harmonic pattern for the signal.

3. The method of claim 1, wherein correlating the set of harmonic patterns further includes for each node of the plurality of nodes:
    selecting a signal with a smallest frequency shift from a first node of the plurality of nodes;
    correlating the set of harmonic patterns to the signal from the first node;
    using a least square to calculate a best matching harmonic pattern from the set of harmonic patterns for the signal; and
    canceling out harmonics in the signal other than the best matching harmonic pattern for the signal.

4. The method of claim 3, wherein correlating the set of harmonic patterns further includes:
    selecting a second signal with a next smallest frequency shift from a second node of the plurality of nodes;
    correlating the set of harmonic patterns to the second signal from the second node;
    using the least square to calculate the best matching harmonic pattern from the set of harmonic patterns for the second signal; and
    canceling out the harmonics other than the best matching harmonic pattern for the second signal.

5. The method of claim 1, wherein the correlated set of harmonic patterns is used to identify a node of the plurality of nodes that transmitted a corresponding signal.

6. The method of claim 1, wherein a size of a the fundamental frequency spectrum varies based on a type of sensor being used.

7. The method of claim 1, further comprising:
    determining a maximum number of nodes in the targeted area, wherein a size of the fundamental frequency spectrum is selected based on the maximum number of nodes.

8. The method of claim 1, wherein generating the set of harmonic patterns for each node of the plurality of nodes is further based on a set of harmonic parameters.

9. The method of claim 8, wherein the harmonic parameters include one or more of a frequency interval between adjacent harmonics, an amplitude of harmonics, or a number of harmonics.

10. A receiver, comprising:
an antenna;
a processor;
memory in electronic communication with the processor; and
instructions stored in the memory, the instructions executable by the processor to:
 determine a plurality of nodes in a targeted area in communication with the receiver;
 design a non-overlapping fundamental frequency spectrum for each node of the plurality of nodes to communicate with the receiver;
 generate a set of harmonic patterns for each node of the plurality of nodes based on the non-overlapping fundamental frequency spectrum; and
 correlate the set of harmonic patterns with received signals from the plurality of nodes.

11. The receiver of claim 10, wherein the instructions are further executable by the processor to:
 select a signal from the received signals;
 use a least square to calculate a best matching harmonic pattern from the set of harmonic patterns for the signal; and
 canceled out harmonics in the signal other than the best matching harmonic pattern for the signal.

12. The receiver of claim 10, wherein the correlated set of harmonic patterns is used to identify a node of the plurality of nodes that transmitted a corresponding signal.

13. The receiver of claim 10, wherein the instructions are further executable by the processor to:
 determine a maximum number of nodes in the targeted area, wherein a size of the fundamental frequency spectrum is selected based on the maximum number of nodes.

14. The receiver of claim 10, wherein the instructions are further executable by the processor to generate the set of harmonic patterns for each node of the plurality of nodes based on a set of harmonic parameters.

* * * * *